United States Patent
Huenefeld et al.

(10) Patent No.: US 7,007,360 B2
(45) Date of Patent: Mar. 7, 2006

(54) METHOD AND APPARATUS FOR DISASSEMBLING A TRACK CHAIN

(75) Inventors: James A. Huenefeld, Chillicoathe, IL (US); Roy L. Maguire, Edelstein, IL (US); Darryl J. Brincks, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 285 days.

(21) Appl. No.: 10/152,491

(22) Filed: May 21, 2002

(65) Prior Publication Data

US 2003/0217453 A1 Nov. 27, 2003

(51) Int. Cl.
*B23P 19/00* (2006.01)

(52) U.S. Cl. ........................................ 29/252
(58) Field of Classification Search ............. 59/7, 59/11; 29/252, 293.53, 293.54, 257
See application file for complete search history.

(56) References Cited

U.S. PATENT DOCUMENTS

| | | | |
|---|---|---|---|
| 3,553,960 A | * | 1/1971 | Ellefson .................... 59/7 |
| 3,711,928 A | | 1/1973 | Boggs |
| 4,083,611 A | | 4/1978 | Schaffner et al. |
| 4,187,744 A | | 2/1980 | Livesay |
| 4,258,463 A | | 3/1981 | Lindquist |
| 4,423,910 A | | 1/1984 | Narang |
| 4,530,546 A | | 7/1985 | Meisel, Jr. |
| 4,553,791 A | | 11/1985 | Blair |
| 4,579,394 A | | 4/1986 | Bedis et al. |
| 4,612,765 A | | 9/1986 | Livesay |
| 4,636,014 A | | 1/1987 | Dennison et al. |
| 4,775,198 A | | 10/1988 | Bokamp et al. |
| 5,214,908 A | | 6/1993 | Livesay et al. |
| 5,214,909 A | | 6/1993 | Livesay et al. |
| 5,222,354 A | * | 6/1993 | Rothstein ................... 59/7 |
| 5,307,618 A | | 5/1994 | Livesay et al. |
| 5,463,862 A | * | 11/1995 | Reisenauer ................. 59/7 |

* cited by examiner

*Primary Examiner*—Robert C. Watson

(57) ABSTRACT

The present invention includes a portable disassembly tool 56 for removing outer track links 36 from a track chain assembly 12. The disassembly tool 56 includes a body adapted to engage the track chain assembly and a moveable ram 66 to engage a pair of track pins 46. During extension of the ram 66, the body 58 engages an outer track link 36 and removes it from the track pins 46. Additionally, a "V" block 104 is provided to engage the track pins 46 and hold the track chain assembly 12 together after the outer track links 36 have been removed.

10 Claims, 5 Drawing Sheets

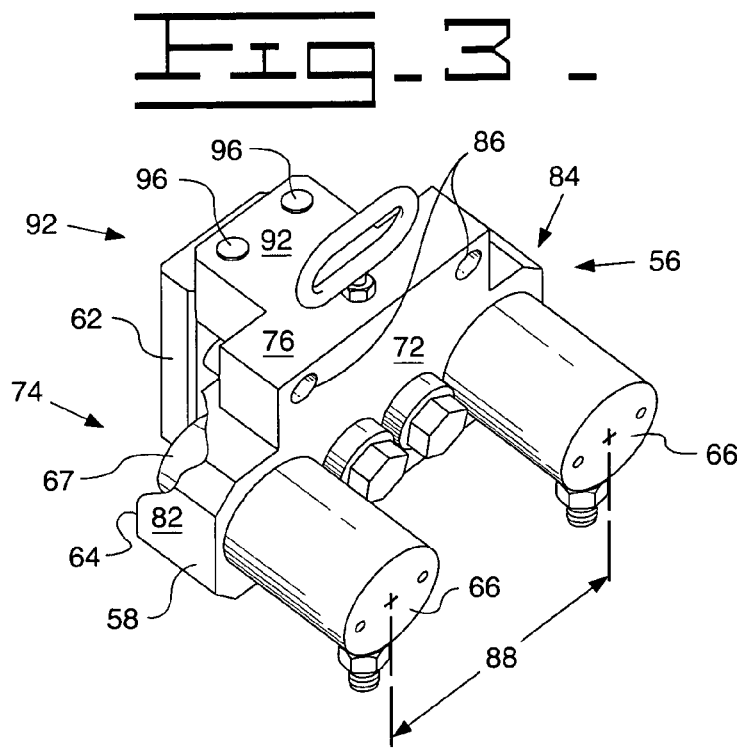
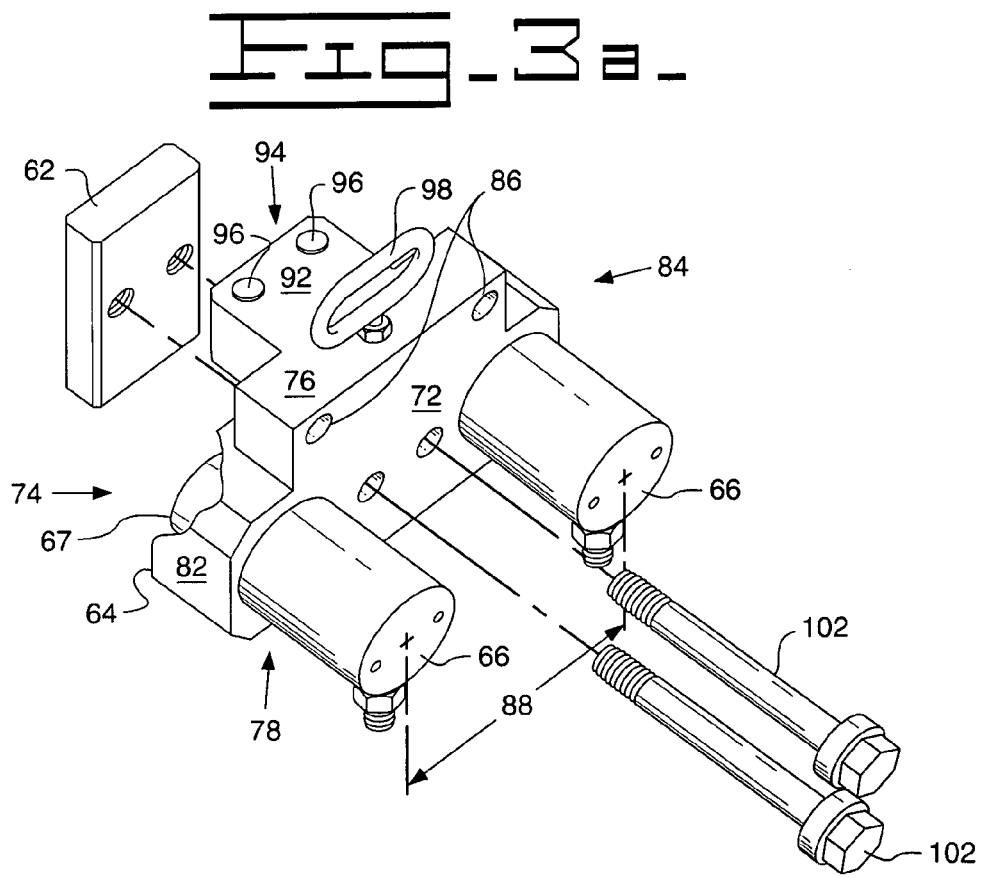

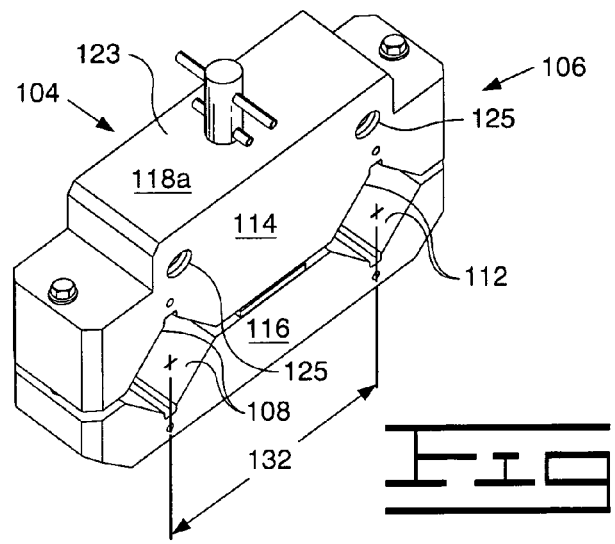
Fig_4_
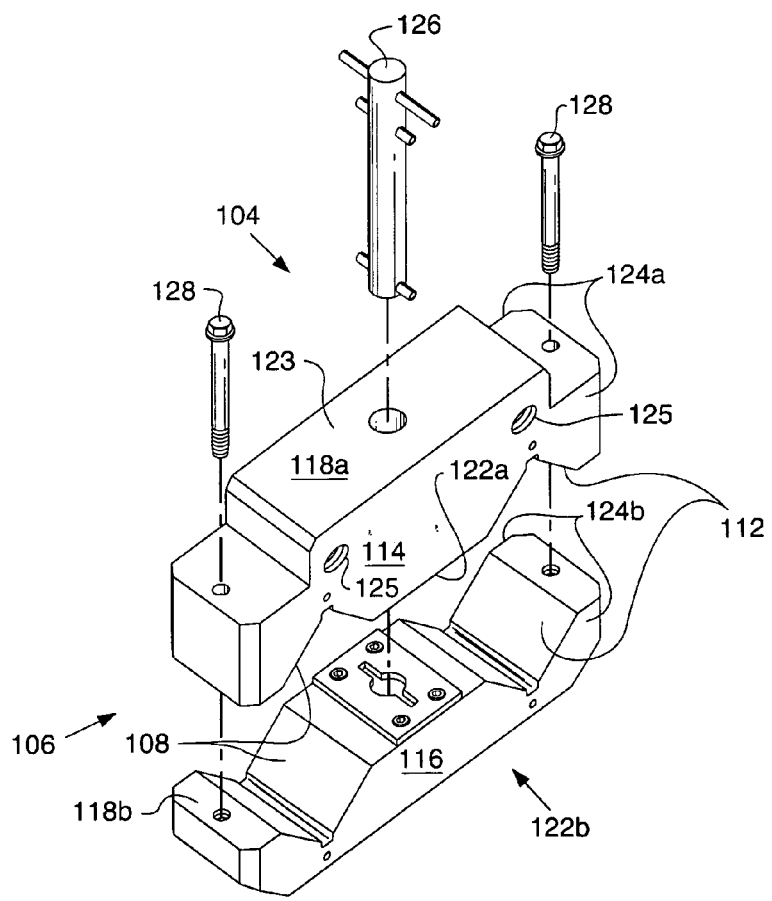
Fig_4a_

METHOD AND APPARATUS FOR DISASSEMBLING A TRACK CHAIN

TECHNICAL FIELD

This invention relates generally to a track chain assembly and more specifically to a method and apparatus for disassembling the track chain.

BACKGROUND

Track type work machines typically have an undercarriage for moving the work machine along the ground. The undercarriage includes track chain assembly encircling a frame rail, a sprocket and a pair of idlers. During use of the work machine the sprocket rotates engaging the track chain assembly, thereby causing the track chain assembly to rotate around a path defined by the sprocket and the idler. The rotation of the track chain assembly causes the work machine to be propelled over the ground so as to perform various work functions.

Track chain assemblies generally include a pair of parallel chains, with each parallel chain being made up of a series of inner and outer track links. Track chain assemblies further include a series of track pins between and connected to the parallel chains. Typical track chain assemblies include two ends that are coupled together using a special two piece master link to form a continuous chain or loop. An example of a typical master link is illustrated in U.S. Pat. No. 4,636,014 to Dennison et al. The track pins and the track links cooperate to form a number of track joints which allow the necessary movement of the track links relative to one another, for example, when the track chain assembly rotates about the sprocket and the idlers.

The cost of the master link is considerably higher than the cost of the other track links. Some of the reasons for the higher costs include the fact that relatively smaller quantities of master links are produced, and manufacturing master links requires different forging tools than a typical track link.

Through normal use, the track chain assembly may require service or replacement of one or more of the track joints. To facilitate this servicing of the track chain assembly, the master link must be disassembled and the track chain removed from the machine. The track chain is then transported to a specially equipped track repair shop. Track repair shops use a track press to disassemble the track chain, replace damaged parts and reassemble the chain. An example of a typical track press can be found in U.S. Pat. No. 5,214,908 to Livesay et al. Track presses are large stationary machines that are extremely expensive to own and operate. Track presses are typically housed in a special building, further increasing the expense of ownership. Making even a minor repair to a track assembly could take days. This down time cost machine owners money for the repair and loss of use of the machine.

What is needed therefore are track chain repair tools which overcome one or more of the above-mentioned drawbacks.

SUMMARY OF INVENTION

In one embodiment of the present invention a disassembly tool is provided for disassembling a track assembly of a track type work machine. The track assembly has a plurality of outer and inner links connected by a plurality of cartridge pin assemblies. Each of the outer links has an outer side and an inner side. The disassembly tool includes a positioning and support mechanism, a body, a link contact portion. a support arrangement, and a pair of rams. The positioning and support mechanism is positionable between the plurality of track links and connectable to adjacent ones of the cartridge pin assemblies. The body has a stationary contact portion on one side thereof that is mateable with the outer side of the track link to be removed. The link contact portion is removably connected to the body by a fastening mechanism and is mateable with the inner side of the same track link to trap the track link between the body and the link contact portion. The support arrangement is connected to the positioning and support mechanism and the body slideably disposed on the support arrangement and moves thereon relative to the positioning and support mechanism. The pair of rams are connected to the body and operative to extend the movable ends thereof relative to the body. The movable ends of the pair of rams are mateable with the associated ends of the cartridge pin assemblies.

BRIEF DESCRIPTION OF THE DRAWINGS

FIG. 3 is a perspective view of an embodiment of the disassembly tool of the present invention.

FIG. 3a is an exploded view of the disassembly tool of FIG. 3.

FIG. 4 is a perspective view of an embodiment of the positioning block of the present invention.

FIG. 4a is an exploded view of the positioning block of FIG. 4.

DETAILED DESCRIPTION

Figure 1:
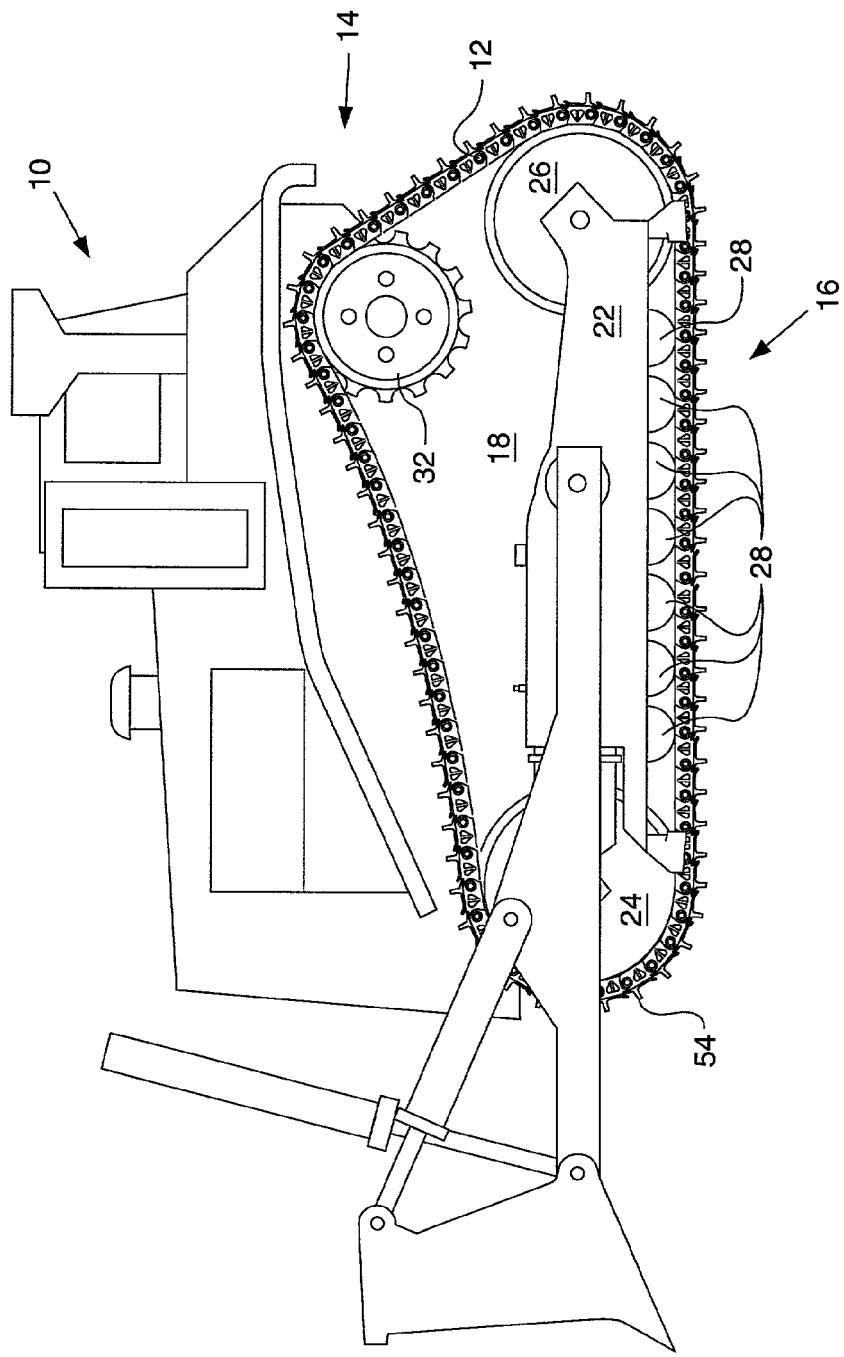
FIG. 1 illustrates a side elevational view of a work machine having a track chain assembly for moving the work machine along the ground.

Referring to FIG. 1, a track type tractor 10 is illustrated, although it should be noted that the present invention may be used on any work machine having a track chain assembly 12. The track type tractor 10 includes a frame shown generally as 14, and an engine (not shown) mounted on the frame 14. An undercarriage assembly 16 having a right side (not shown) and a left side 18 is attached to the frame 14. The undercarriage assembly 16 includes a frame rail 22 having a front idler 24 and a rear idler 26 mounted thereupon. Pluralities of bogie wheels 28 are positioned below the frame rail 22 between the front and rear idlers 24, 26. A drive sprocket 32 is positioned above the undercarriage 16 and is drivingly coupled to the engine. The track chain assembly 12 encompasses the undercarriage assembly 16 and engages the drive sprocket 32, front idler 24, rear idler 26 and bogie wheels 28.

Figure 2:
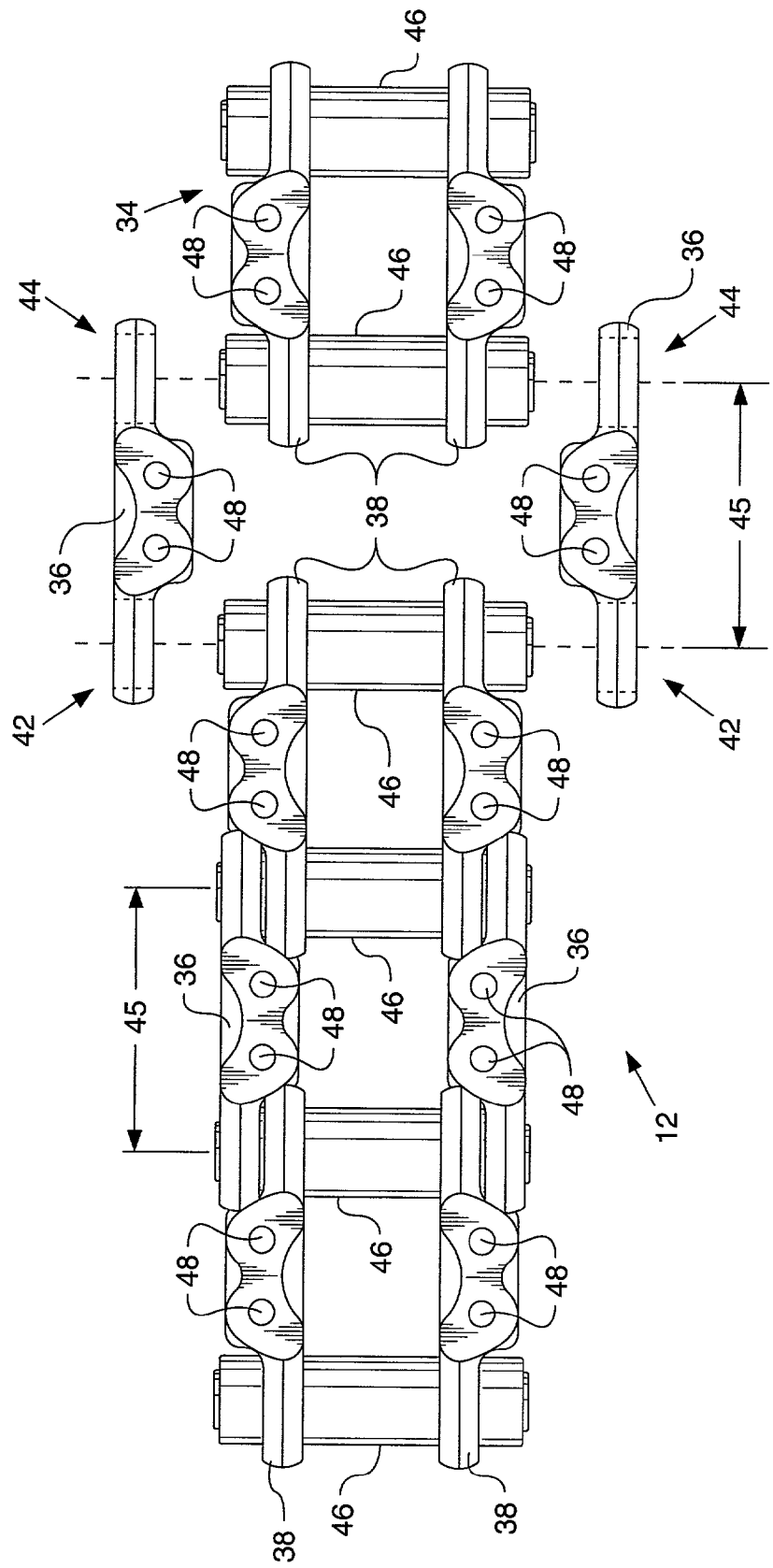
FIG. 2 is a top view of a partially exploded view of a track chain as used on the work machine of FIG. 1.

Referring now to FIG. 2, the track chain assembly 12 generally includes a plurality of pairs of track joint assemblies 34 pivotally connected together by pairs of outer track links 36. Each track joint assembly 34 includes a pair of inner track links 38 disposed parallel to one another. Each of the inner and outer track link 36, 38 defines a first aperture 42 and a second aperture 44. The first and second apertures 42,44 are space a predetermine distance from one another. The predetermined distance defines a track pitch 45. The first and second apertures 42,44 are configured to receive and provide an interference fit with a track cartridge pin assembly, hereinafter referred to as a track pin 46. The track pins 46 and the plurality of inner and outer track links 36,38 cooperate to form the track assembly 12. Each of the inner and outer track links 36,38 also defines a pair of bolt holes 48. Each bolt hole 48 receives a bolt (not shown), four bolts attach each track shoe 54 to the track chain assembly 12.

Referring now to FIG. 3 and 3a, a disassembly tool 56 of the present invention is illustrated. The disassembly tool 56 includes a body 58, a link contact portion 62, a stationary contact portion 64 and first and second rams 66 attached to the body 58. Each of the rams having a movable end 67. The body 58 as shown is a steel member having a first side 72 and a second side 74, a top surface 76, a bottom surface 78, a first end 82 and a second end 84. a pair of spaced apart holes 86 are defined in the body 58 and extend between the first and second sides 72,74. A pair of bores (not shown) are defined in the body 58 and extend from the first side 72 to the second side 74 to permit passage of the movable ends 67 of the respective first and second rams 66. The bores are spaced a predetermined distance 88 from one another. The predetermined distance 88 is substantially equal to the pitch 45 of the inner and outer track links 36,38. As illustrated, the pair of rams 66 are attach to the body 58 so as to align with the pair of bores (not shown). In a preferred embodiment, the pair of rams 66 are hydraulically actuated, however, pneumatic or other types may be used. A locator portion 92 extends from the top surface 76 of the body 58 and extends past the second side 74. The locator portion 92 is shown having a pair of locators 94, In the subject embodiment, the locaters 94 being cylindrical pins 96 extending downward from the locator portion 92. The locators 94 are configured to engage the pair of bolt holes 48 on the outer track links 36. When the locator pins 96 engage the bolt holes 48 of the outer track links 36, the body 58 is held in a position such that the pair of rams 66 align with the track pins 46. Alternately, the locator portion 92 may be configured to engage other features of the track assembly 12 without varying from the scope of the present invention. A handle 98 is provided on the body 58 to facilitate lifting the disassembly tool 56 using a hoist or other mechanical device.

The link contact portion 62 as shown in FIG. 3 is a rigid member offset from the second side 74 of the body 58. The link contact portion 62 as shown, is removably attached to the body 58 by a pair of studs 102. Alternately, the link contact portion 62 could be integral of the body 58 and the locator portion 92 forming a rigid "U" shaped structure.

Referring now to FIG. 4 and 4a, a positioning and support mechanism, or "V" block 104 adapted for use with the disassembly tool 54 of the present invention, is shown. The "V" block 104 includes a rigid main member 106 having a first pin engagement portion 108 and a second pin engagement portion 112. The "V" block 104 as illustrated shows the main member 106 as having a top portion 114 and a bottom portion 116. The top portion 114 includes a top surface 118a, a bottom surface 122a and a pair of sides 124a. The top portion 114 includes a raised portion 123 having a pair of threaded holes 125 disposed therein on one of the sides 124a. The pair of threaded holes 125 are spaced from one another equal to the spacing between the holes 86 in the body 58. The threaded holes 125 are configured to receive a pair of support rods 127 (shown in FIG. 5) that, during operation, supports the body 58 of the disassembly tool 56 once the outer link 36 has been removed. The bottom portion 116 includes a top surface 118b, a bottom surface 122b and a pair of sides 124b. The bottom surface 124a of the top portion 114 is configured to face the top surface 118b of the bottom portion 116. The top and bottom portions 114, 116 of the "V" block 104 can be fastened together using a locking pin 126 and a pair of bolts 128.

The first and second pin engagement portions 108, 112 are defined by the bottom surface 122a of the top portion 114 and the top surface 118b of the bottom portion 116, respectively. The pin engagement portions 108, 112 are spaced apart from one another a distance 132 substantially equal to that of the pitch 45 of the outer track link 36. The pin engagement portions 108,112 are illustrated having a"V" shape. When the top and bottom portions 114, 116 are aligned the pin engagement portions 108, 112 form a diamond shape. When the locking pin 126 and pair of bolts 128 fasten the top portion 114 and bottom portion 116 together, the diamond shape of the pin engagement portions 108, 112 act to position each track pin 46 relative to the apertures 42,44 of the outer track link 36 to be installed.

Figure 5:
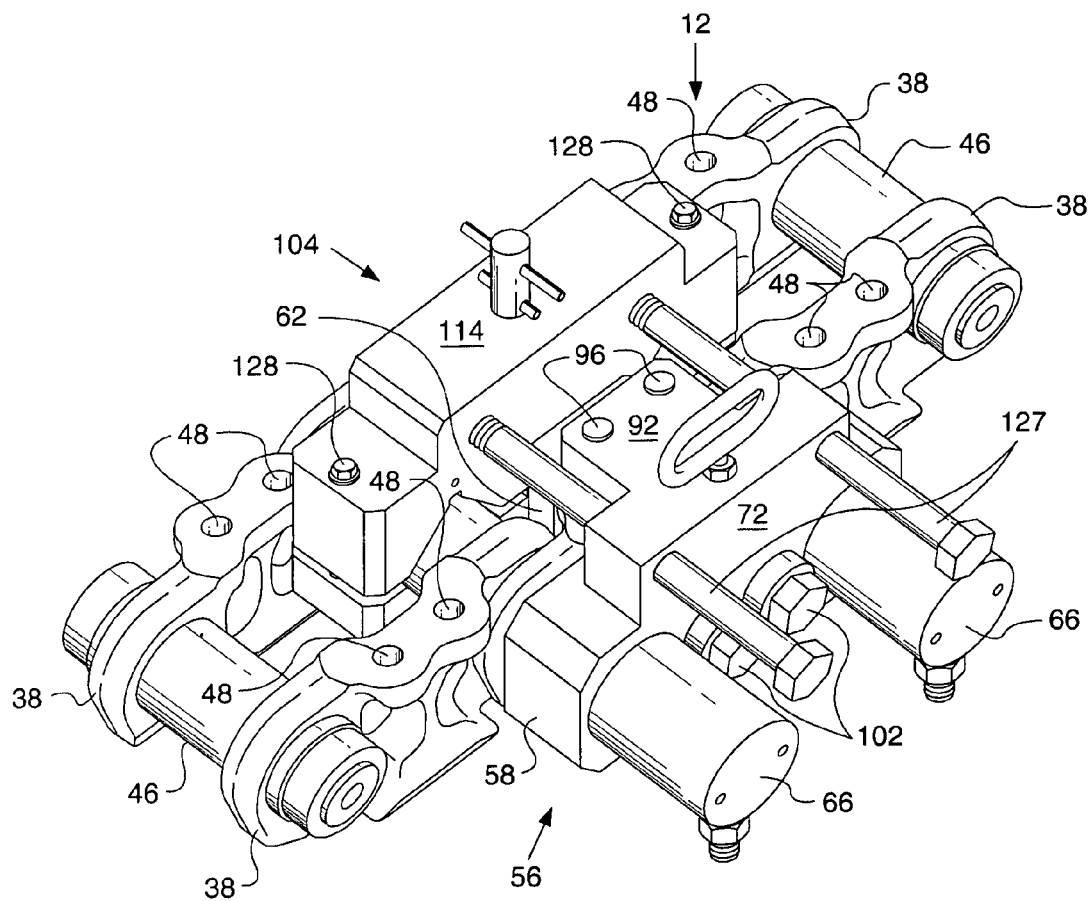
FIG. 5 is a perspective view of the disassembly tool and the positioning block of the present invention being in cooperating engagement with a track chain.

Referring to FIG. 5, the track chain assembly 12 having a plurality of track pins 46 is shown with the "V " block 104 and the disassembly tool 56 disposed thereon. The "V " block 104 is positioned about the track pins 46 and secured thereto and the disassembly tool 56 is placed in position and supported by insertion of the support rods 127. the pair of rams 66 are aligned with the track pins 46 by the locator pins that engage the holes 48 of the outerlink 36 that is being removed. Extension of the movable ends of the rams 66 causes the disassembly tool 56 to pull the outer link 36 from the track chain assembly 12.

INDUSTRIAL APPLICABILITY

In operation the disassembly tool 56 of the present invention provides a method and an apparatus to enable service and repair of a track chain assembly 12 at a remote location.

Once the disassembly tool 56 has been delivered to the machine a service technician can service that track chain assembly 12 using the following steps. Find a portion of the track chain assembly 12 that is not being obstructed by the machine itself. Typically the portion between the rear idler 26 and drive sprocket 32 provides easy access. To provide access to the track chain assembly 12, the track shoes 54 nearest the portion of the track chain assembly 12 to be repaired must be removed. Each track shoe 54 is removed by removing the four nuts and bolts that secure the shoe to the track links 36, 38.

The "V" block 104 is disassembled by removing the pair of bolts 128 and loosening the locking pin 126. The bottom portion 116 is brought into position such that each of the pin engagement portions 108, 112 engage with one of the track pins 46 engaging the outer link 36 to be removed. The top portion 114 is then positioned to engage the top surface 118b of the bottom portion 116. The locking pin 126 is turned to fasten the top portion 114 and bottom portion 116 together. The pair of bolts 128 are next inserted though the top portion 114, into the bottom portion 116, and tightened to secure the "V" block 104 to the track pins 46.

The disassembly tool 56 is then removed from its container, the link contact portion 62 and the body 58 having the stationary contact portion 64 should be inspected to verify that they are the properly sized tools to fit the pitch 45 of the track links 36, 38. The disassembly tool 56 is then positioned with the pins 96 engaging the holes 48 of the outer track link 36 that is being removed. A portable hoist may be used, as needed, to lift and position the disassembly tool 56. After the disassembly tool 56 has been positioned, the support rods 127 are installed through the holes 86 and threaded into the threaded holes 125 of the "V" block 104. Following installation of the support rods 127, appropriate hydraulic or pneumatic hoses should be connected to the rams 66.

Upon actuating the rams 66, the movable ends 67 thereof engage the track pins 46 of the outer track link 36. As the movable ends 67 of the rams 66 continue to extend relative to the body 58, the body 58 and attached link contact portion 62, with the outer track link 36 secured therebetween, begin to move. Continued extension of the rams 66 causes the outer track link 36 to be pulled from the track chain assembly 12. Once the rack link 36 is free pins 46, the weight of the disassembly tool 56 along with the secured outer track link 36 is held by the support rods 127 until the support rods 127 are removed. The outer track link 36 is removed from the disassembly tool 56 by retracting the movable ends 127 of the rams 66 and the removal of the bolts 102.

What is claimed is:

1. A disassembly tool for disassembling a track assembly of a track type work machine, the track assembly having a plurality of outer and inner track links connected by a plurality of cartridge pin assemblies, each of the outer links having an outer side and an inner side, said disassembly tool comprising:
    a positioning and support mechanism positionable between the plurality of track links and connectable to adjacent ones of the cartridge pin assemblies;
    a body having a stationary contact portion on one side thereof that is mateable with the outer side of the track link to be removed;
    a link contact portion removably connected to the body by a fastening mechanism, the link contact portion being mateable with the inner side of the same track link to trap the track link between the body and the link contact portion;
    a support arrangement operatively connected to the positioning and support mechanism, the body being disposed on the support arrangement and slideable thereon relative to the positioning and support mechanism; and
    a pair of rams connected to the body and operative to extend the movable ends thereof relative to the body, the movable ends being mateable with the associated ends of the cartridge pin assemblies.

2. The disassembly tool of claim 1, wherein said disassembly tool includes at least one locator, said locator being configured to maintain said disassembly tool in a predetermined position relative to said track assembly.

3. The disassembly tool of claim 1 wherein the pair of rams are hydraulic actuators.

4. The disassembly tool of claim 1 wherein the link contact portion is a flat member and the fastening mechanism is a plurality of bolts.

5. The disassembly tool of claim 1 wherein the support arrangement is a pair of support rods disposed through the body and connected to the positioning and support mechanism.

6. The disassembly tool of claim 1 wherein the positioning and support mechanism includes first and second members that are selectively connectable to one another, each of the first and second members having notches of a predetermined size and shape defined thereon and spaced from one another at a predetermined distance.

7. The disassembly tool of claim 6 wherein in the track assembly, a track pitch is defined by the spacing between adjacent one of the plurality of cartridge pin assemblies and the predetermined distance between the notches in the first and second members of the positioning and support mechanism is equal to the track pitch.

8. The disassembly tool of claim 1 including a locator portion disposed on the body and operative to position the body relative to the cartridge pin assemblies of the track link to be removed.

9. The disassembly tool of claim 8 wherein the locator portion includes locator pins disposed in the body thereof.

10. The disassembly tool of claim 9 wherein the respective track links have holes defined in the top surface thereof and the locator pins of the locator portion engage the holes in the top of the track link.

\* \* \* \* \*